United States Patent [19]

Simmons et al.

[11] Patent Number: 5,503,187
[45] Date of Patent: Apr. 2, 1996

[54] MULTIPLE SYNCHRONIZED THREAD CONNECTOR

[76] Inventors: John M. Simmons, 605 Slayton; Tom M. Simmons, 504 Slayton, both of Saginaw, Mich. 48603

[21] Appl. No.: 493,565

[22] Filed: Jun. 22, 1995

Related U.S. Application Data

[63] Continuation-in-part of Ser. No. 178,909, Jan. 7, 1994, Pat. No. 5,452,748.

[51] Int. Cl.⁶ .............................. F16L 55/10; F16L 41/04; F16L 15/00
[52] U.S. Cl. ..................... 138/89; 411/436; 411/411; 411/424; 220/288; 215/329; 215/356; 285/333; 285/390; 285/392; 285/901; 285/357
[58] Field of Search ..................... 285/392, 357, 285/333, 390, 393, 901; 411/427, 436, 411, 424, 378; 403/299, 343, 342, 307, 296; 215/217, 219, 259, 329; 220/288, 354, 464; 138/96 T, 89

[56] References Cited

U.S. PATENT DOCUMENTS

| | | |
|---|---|---|
| 417,393 | 12/1889 | McAllister. |
| 1,372,876 | 3/1921 | Freund. |
| 1,474,905 | 11/1923 | Keszthelyi ........................... 285/333 |
| 2,019,402 | 10/1935 | Duffy ..................................... 215/43 |
| 2,678,226 | 5/1954 | Wright .................................... 287/60 |
| 2,977,993 | 4/1961 | Scherer .................................. 139/96 |
| 3,120,570 | 2/1964 | Kennedy ............................... 264/45 |
| 3,308,979 | 3/1967 | Hailes ..................................... 215/9 |
| 3,470,929 | 10/1969 | Thornton ......................... 220/288 X |
| 4,342,337 | 8/1982 | Underwood ....................... 138/96 T |
| 4,986,078 | 1/1991 | Laskaris ................................ 62/51.1 |
| 5,045,826 | 9/1991 | Laskaris .............................. 335/301 |

Primary Examiner—Dave W. Arola
Assistant Examiner—Heather Chun Shackelford
Attorney, Agent, or Firm—Prince, Yeates & Geldzahler

[57] ABSTRACT

A screw-threaded connection incorporates multiple synchronized threads, that is, one connection element has one or more sets of male threads that mates with one or more corresponding sets of female threads on the mating connection element, in customary fashion. Of course, the multiple sets of threads on the mating connection element are synchronized such that their leads are the same, and, of course, the same as the sets of mating multiple synchronized threads. This multiple synchronized thread connection has application to any fluid connector and particularly to fluid connectors in wide-variant temperature deviation, high-pressure, and/or mechanical vibration environments.

23 Claims, 7 Drawing Sheets

5,503,187

MULTIPLE SYNCHRONIZED THREAD CONNECTOR

CROSS-REFERENCE TO RELATED APPLICATION

This application is a Continuation-In-Part of U.S. application entitled Synchronized Dual Thread Connector, U.S. Ser. No. 08/178,909, filed Jan. 7, 1994 now U.S. Pat. No. 5,452,748.

BACKGROUND OF THE INVENTION

1. Field of the Invention

The present invention relates to connectors and other threaded mechanisms, and more particularly, relates to threaded connectors and threaded mechanisms that incorporate mating sets of multiple synchronized threads for effecting the union between the threaded connections.

2. Description of the Prior Art

It is well known in the prior art to have a tube, pipe or other cylindrical object that incorporates dual threads. That is, a portion of the external surface of the pipe includes male threads, and a portion of the internal surface of the pipe includes female threads. Such dual-threaded cylindrical devices are typically utilized wherein a cap or cover screws onto the end of the pipe or tube utilizing the male threads, and the female threads are utilized for providing a screw-adjustment to an internal mechanism where the tube or pipe is connected. An example is a fluid pressure relief valve, wherein the relief pressure is adjustable by turning a threaded plug or the like within the internally threaded tube, the threaded plug engaging a spring and ball mechanism that defines the relief valving mechanism, the screw-adjustment mechanism within the tube being environmentally protected by a cap that screws over the end of the pipe or tube, utilizing the male threads of the pipe or tube. Another example is the valve stem used on vehicle tires and wheels, wherein the internally threaded portion of the cylindrical valve stem is utilized to threadedly receive therein the valve core element which defines the closure mechanism for the valve stem, and the male threads on the end of the cylindrical valve stem receive thereon the plastic or metal cap which is an environmental seal for the valving mechanism within the valve stem.

In these prior art dual thread applications, the internal and external threads function independently of each other, the internal threads serving a function related to the operation of the device itself, and the external threads simply serving as a means to attach a protective environmental cover over the internal mechanism.

In many prior art fluid devices (pumps, valves, motors, etc.), the device includes a cap or cover plate that must effectively seal the inner workings of the device. Such a cap or cover plate generally covers and seals a portion of the device body that needs to be accessible for purposes of manufacture, assembly, adjustment, etc. Many times these caps or plates are made of a different material from that of the device body. In such instances, differences in rates and amounts of material expansion and contraction between the cap or plate and the fluid device body occur because of applications of the fluid device in extremely high or low temperature environments, in high pressure environments, and/or due to water absorption by plastic components. In addition, conventional connector caps or nuts are generally of thinner wall construction than the bodies or mating connectors, and therefore tend to expand as the cap or nut is tightened, because of rotational (diametrical) thrust between the device threads and cap threads. In such instances (threaded caps or plates expanding different amounts and at different rates), thread separation occurs, thereby jeopardizing the fluid/environmental seal between the cap and plate or fluid device body.

OBJECTS OF THE INVENTION

It is an object of the present invention to provide a threaded engagement between two mating pieces that eliminates the problem of thread separation caused by different rates of expansion of dissimilar mating materials.

It is an object of the present invention to provide a threaded engagement between two mating pieces that eliminates the problem of thread separation caused by rotational thrust between the mating threads of the mating pieces.

It is a further object of the present invention to provide a threaded connection that increases the thread strength over the thread length in the mating threaded connectors.

It is a further object of the present invention to provide mating threaded connectors that more effectively maintain their circularity in contact, thereby maximizing actual thread contact between the mating threaded connectors.

It is a still further object of the present invention to provide mating threaded connectors that provide full thread strength in areas where recommended thread depth is not otherwise obtainable.

It is a still further object of the present invention to provide mating threaded connectors that are not susceptible to loosening under vibration as the mating connectors expand and contract due to varying thermal and/or pressure effects, or as a result of tightening.

SUMMARY OF THE INVENTION

A threaded connector comprises two members, each incorporating concentric multiple synchronized threads that are adapted to engage mating concentric multiple synchronized threads of the mating connector member, such that each mating connector member includes at least one set each of both male threads and female threads.

DETAILED DESCRIPTION OF THE INVENTION

Figure 1:
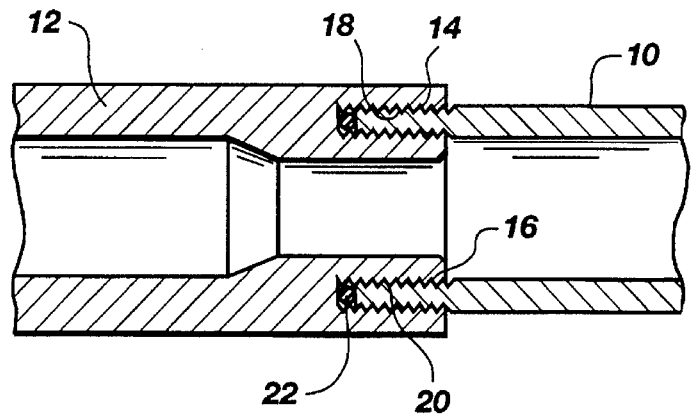
FIG. 1 is a sectional view taken through a simple pipe sleeve connection embodying the dual synchronized thread connectors of the present invention.

Turning now to the drawings, and initially to FIG. 1, the concept of the present invention is shown in its most simplistic form, that being a threaded connection between two pipes or other fluid conduits, one of them having an area of increased wall thickness in order to accommodate and accept the threaded end of the other. FIG. 1 is a sectional view through the threaded connectors, and illustrates a first threaded connector 10 on the right and the mating threaded connector 12 on the left. As shown, the first connector 10 is formed with a set of male threads 14 on the end thereof in a customary manner for a threaded pipe. In addition, the first connector 10 includes a set of female threads 16 formed in an annular channel in the internal surface of the connector, also in a customary fashion. In accordance with the present invention, these internal and external threads 14 and 16, respectively, are synchronized, such that rotating the first connector 10 in the right hand (clockwise) direction enables both the external and internal threads to travel along and engage mating threads on the mating threaded connector 12. In this regard, the mating connector 12 includes a set of female threads 18 that engage corresponding male threads 14 of the first connector, and mating male threads 20 that engage corresponding female threads 16 of the first connector. Of course, these corresponding internal and external threads 18 and 20, respectively, of the mating threaded connector 12 are also synchronized with each other so that they mate with and engage the synchronized male threads 14 and female threads 16, respectively, of the first threaded connector 10 as the two threaded connectors are screw-threaded together.

In the embodiment shown in FIG. 1, all of the thread sets 14, 16, 18 and 20 are straight threads, as opposed to tapered pipe threads. Straight threads are not designed to serve as fluid seals between the two mating threaded pieces. Therefore, the embodiment of FIG. 1 includes an O-ring 22 in the bottom of the annular channel defined by the second connector synchronized female threads 18 and male threads 20, for providing the fluid seal between the first and second threaded connectors 10, 12. Of course, the thread sets 14, 16, 18 and 20 can be tapered threads, which are designed to effect a fluid seal therebetween, thereby obviating the necessity for the O-ring fluid seal. Also, of course, the fluid seal can be effected by sealing means other than O-rings, i.e., by any fluid seal design or type that is typical for the particular industry in which a multiple synchronized thread connector of the present invention is utilized.

Figure 2:
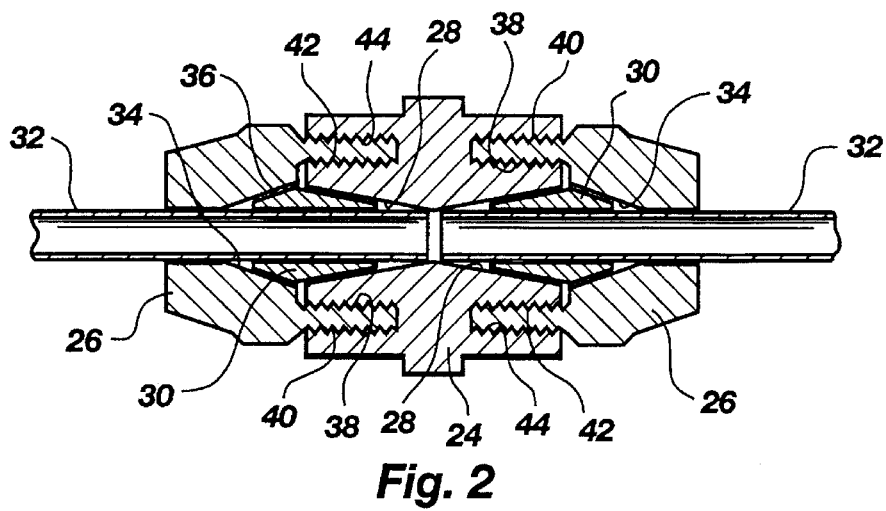
FIG. 2 is a sectional view taken through an in-line union fluid connector that utilizes the dual synchronized threads of the present invention, in a ferrule-type connector.

FIG. 2 is a sectional view taken through an in-line union ferrule-type fluid connector that utilizes the dual synchronized threads of the present invention. As shown, the connector of this embodiment comprises a union 24 and two nuts that are identical, and therefore will be designated by the same reference numeral 26. The union 24 includes identical and opposed frustoconical tapered surfaces 28 that engage respective tapered ferrules 30 positioned around identical ends of conduits or tubing 32 to be connected together in a fluid seal. Each nut 26 also includes a frustoconical tapered surface 34 for engaging the opposite tapered surface 36 of the ferrule 30. The workings of the union connector of FIG. 2 are customary and standard in the fluid industry.

Each nut 26 includes, in addition to the customary female threads 38, a set of male threads 40 that are, of course, synchronized with the female threads 38. These respective female threads 38 and male threads 40 of the nut engage respective synchronized male threads 42 and female threads 44 of the union 24. As is customary, these union connector threads 38, 40, 42, and 44 are straight threads, as opposed to tapered or pipe threads, and therefore do not effect a fluid seal. Rather, as is customary, the fluid seal of the connector of FIG. 2 is effected by the tapered ferrules 30 and their engagements with respective frustoconical tapered surfaces 28 of the union and 34 of the nut, and the ferrules' engagement with the fluid conduits 32.

In accordance with the concept of the present invention, the union 24 and nuts 26 incorporate dual synchronized thread connections in order to effect one or more of the objects of the present invention, as applied to ferrule-type fluid connectors. Specifically, the dual synchronized threads of the FIG. 2 connector maintain the circularity of both mating pieces and of the ferrule and fluid conduit. Dual synchronized threads also eliminate the possibility of the connector threads' separating due to dissimilar rates of expansion of the union and nuts constructed of dissimilar materials, and due to expansion of the conventional connector nut that has no outer portion of the union body to prevent such expansion.

Figure 3:
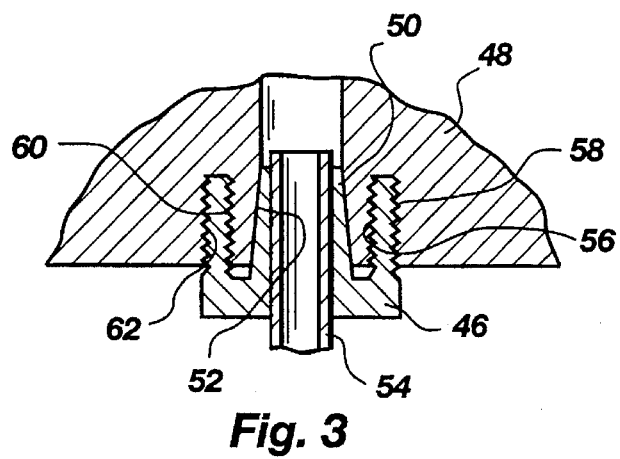
FIG. 3 is a sectional view taken through a dual synchronized thread ferrule connector nut that screws into the body of a fluid device, the ferrule being formed with the nut.

FIG. 3 is a sectional view taken through an alternative ferrule-type fluid connector that utilizes the dual synchronized threads of the present invention, the ferrule being formed as part of the nut. As shown, the connector of FIG. 3 includes a nut 46 that is adapted to threadedly engage the body of a fluid device 48, as in a pump, valve, motor, etc. The nut 46 has incorporated therewith a tapered ferrule 50 that is adapted to engage a mating frustoconical tapered surface 52 of the body of the fluid device in the customary manner to compress the ferrule down around a fluid conduit 54 as the nut is screwed into the body of the fluid device.

The nut 46 includes, in addition to the customary female threads 56, a set of synchronized male threads 58 that engage respective synchronized male threads 60 and female threads 62 formed with the body of the fluid device. The nut 46 of FIG. 3 functions in an identical manner to that of the nut 24 of the FIG. 2 connector to compress the tapered ferrule 50 down against the fluid conduit 54 in the customary manner as the nut is screwed into the fluid device 48. Again, the multiple synchronized threads of the present invention incorporated into the connector of FIG. 3 effect the same objects in maintaining the fluid seal between the fluid device and conduit as in the previously described fluid connectors.

Figure 4:
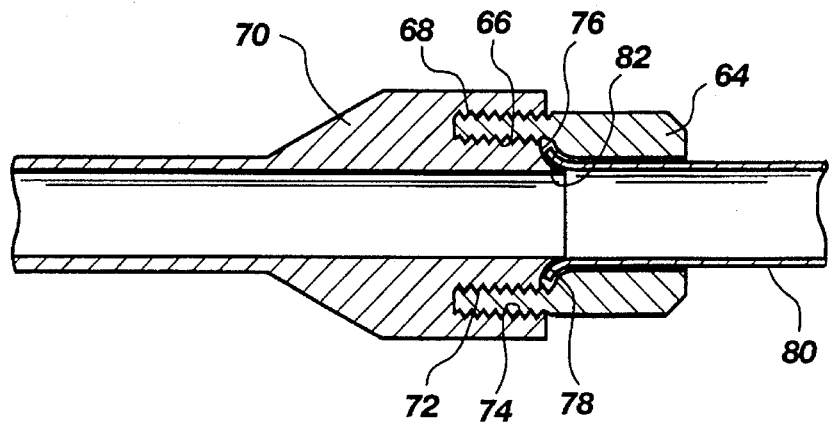
FIG. 4 is a sectional view taken through an in-line dual synchronized thread connector for use with a flared fluid conduit.

FIG. 4 is a sectional view taken through an in-line dual synchronized thread connector for use with a flared end fluid conduit. The connector of the embodiment of FIG. 4 comprises a nut 64 which is formed with a set of female threads 66 in a customary manner for a flared end conduit connector nut. In addition, the nut 64 includes a set of male threads 68 on the external surface thereof which are synchronized with the female threads 66, as has been previously described. The nut 64 is adapted to threadedly engage and be received into a mating connector 70. This mating connector 70 includes an annular channel having a set of male threads 72 that engage corresponding female threads 66 of the nut, and a set of synchronized female threads 74 that engage corresponding male threads 68 of the nut.

The mating connector 70 also includes an inner tapered annular surface 76 that is adapted to engage and seal against a mating flared surface 78 of the fluid conduit 80. In this regard, the nut 64 also includes an inner tapered annular surface 82 that mates with the backside of the conduit flared surface 78 and urges the flared surface in fluid sealing relationship against the inner tapered annular surface 76 of the mating connector piece 70 in the convention manner to effect the fluid seal therebetween. The operation of the flared-type fluid connector of FIG. 4 is customary and standard in the fluid industry.

In accordance with the concept of the present invention, the flared fluid conduit nut 64 and mating connector 70 incorporate dual synchronized thread connections in order to effect one or more of the objects of the present invention, as applied to flared end conduit fluid connections. Specifically, the dual synchronized threads of the connector of FIG. 4 maintain the circularity of both mating pieces, the nut and mating connector, and specifically of the conduit flared surface 78 and the inner tapered annular surface 76 of the connector 70 to maintain a tight fluid seal therebetween, and also eliminate the possibility of the connector threads' separating due to dissimilar rates of expansion of the nut and its mating connector constructed of dissimilar materials.

Figure 5:
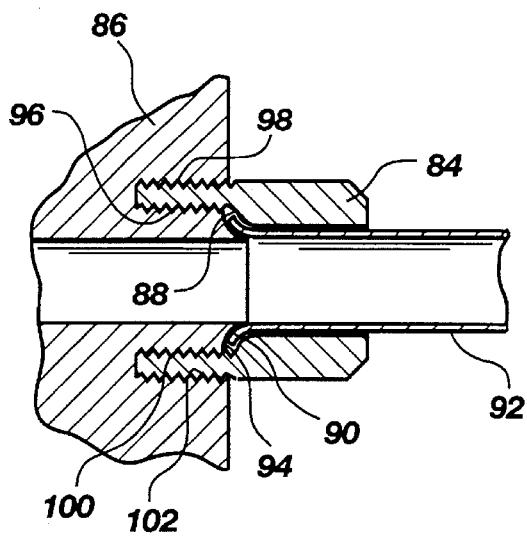
FIG. 5 is a sectional view through a flare-type dual synchronized thread connector, wherein the connector nut engages a portion of the body of a fluid device.

FIG. 5 is a sectional view through a flare-type dual synchronized thread connector, wherein the connector nut 84 is adapted to threadedly engage the body of a fluid device 86 as in a pump, valve, motor, etc. The nut 84 has incorporated therewith an inner tapered annular surface 88 that engages the backside of a flared end 90 of a fluid conduit 92 in the customary manner to urge the conduit flared end against a mating inner tapered annular surface 94 of the fluid device body 86 in order to effect a fluid seal therebetween. The nut 84 includes, in addition to the customary female threads 96, a set of synchronized male threads 98 that engage respective synchronized male threads 100 and female threads 102 formed in an annular channel in the body of the fluid device.

The nut 84 of FIG. 5 functions in an identical manner to that of the nut 64 of the FIG. 4 connector to urge the conduit flared end 90 against the fluid device body inner tapered annular surface 94 in the customary manner to effect the fluid seal therebetween as the nut is screwed into the fluid device 86. Again, the dual synchronized threads of the present invention incorporated into the connector of FIG. 5 effect the same objects in maintaining the fluid seal between the fluid device and conduit as in the previously described fluid connectors.

Figure 6:
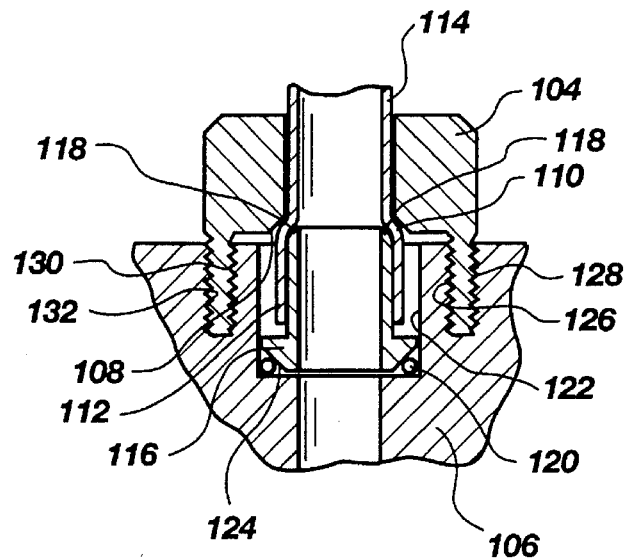
FIG. 6 is a sectional view similar to FIG. 5, illustrating a different type of fluid conduit flared connection.

FIG. 6 is a sectional view similar to FIG. 5, illustrating a different type of fluid conduit flared end connector. The connector of FIG. 6 includes a nut 104 that is adapted to threadedly engage the body of a fluid device 106, as in a pump, valve, motor, etc. The nut 104 has incorporated therewith an inner tapered annular surface 108 that is adapted to urge against an annular transition area 110 of an enlarged end 112 of a fluid conduit 114.

The fluid connector of FIG. 6 includes a ferrule sleeve 116 that functions similarly to the inner tapered annular surface 76 of the connector of FIG. 4 and inner tapered annular surface 94 of the fluid device body of FIG. 5 to form a fluid seal between the ferrule sleeve and the conduit 114. In this embodiment, the inner annular tapered surface 108 of the nut urges the annular transition area 110 of the conduit against a mating second annular tapered surface 118 of the ferrule sleeve in order to effect a fluid seal therebetween. The fluid seal between the ferrule sleeve 116 and the body of the fluid device 106 is effected by an O-ring seal 120 positioned in an annular channel defined by the bottom of the fluid device body borehole 122 and a tapered annular surface 124 of the ferrule sleeve 116.

The nut 104 in the FIG. 6 embodiment includes, in addition to the customary female threads 126, a set of synchronized male threads 128 that engage respective synchronized male threads 130 and female threads 132 formed in an annular channel in the body of the fluid device 106. The nut 104 of FIG. 6 functions in an identical manner to that of the nut 84 of the FIG. 5 connector to compress the conduit annular transition area 110 down against the tapered annular surface 118 of the ferrule sleeve 116 to effect a fluid seal therebetween in the customary manner as the nut is screwed into the fluid device. In addition, tightening the nut 104 down against the fluid conduit and ferrule sleeve also effects the fluid seal provided by the O-ring 120. Again, the dual synchronized threads of the present invention incorporated into the connector of FIG. 6 effect the same objects in maintaining the fluid seal between the fluid device and conduit as in the previously described fluid connectors.

Figure 7:
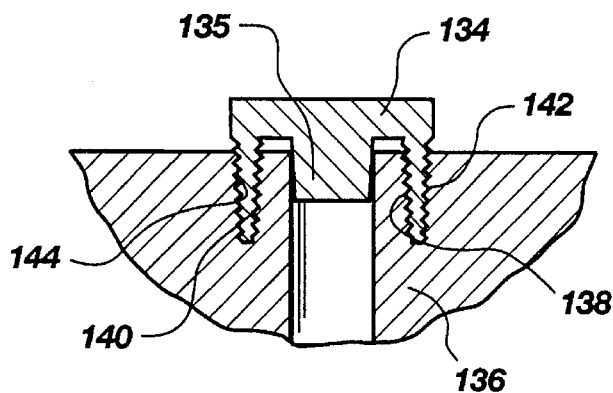
FIG. 7 is a sectional view through a dual synchronized thread protective cap that is adapted to cover an open access area of a fluid device.

FIG. 7 is a sectional view through a dual synchronized thread protective cap 134 that is adapted to cover an open access area of a fluid device 136. This protective cap 134 includes a set of female threads 138 adapted to engage mating male threads 140 formed in an annular channel in the body of the fluid device, as is customary in caps of this nature. In addition to the female threads 138, the protective cap includes a set of synchronized male threads 142 adapted to engage and mate with corresponding synchronized female threads 144 formed with the fluid device.

The protective cap 134 of FIG. 7 is adapted to cover an open access area of a fluid device, as in a pump, motor, valve, etc., and therefore must effect a fluid and environmental seal between the cap and body of the fluid device. Therefore, these mating synchronized threads 138 and 142 of the cap and 140 and 144 of the fluid device body are tapered threads in order to effect the fluid seal therebetween as the cap is tightened down into the fluid device body. FIG. 7 illustrates the taper to both sets of tapered threads 138, 140 and 142, 144 to be somewhat exaggerated from what would generally be necessary in a conventional tapered sealing thread. The taper is exaggerated in the illustration in order that the existence of the taper be clearly evident from the drawings.

It can be appreciated that, in certain instances, the tapered threads of the protective cap 134 could tend to collapse the walls of the fluid device 136 around the access opening, as in when the device is constructed of plastic or other soft material, and/or the wall between the access opening and fluid device male threads 140 is relatively thin. In such instances, it is desirable to form the protective cap 134 with a shoulder 135 that is designed to fit into the access opening to oppose such wall collapse. This cap shoulder 135 may include a slight taper, for instance in an amount equal to the thread taper, in order to more effectively seal against the access opening wall, and prevent collapse or movement of the access opening wall.

In accordance with the concept of the present invention, the protective cap 134 and its threaded connection into the fluid device 136 incorporate dual synchronized threads in order to effect one or more of the objects of the present invention. Specifically, the dual synchronized threads of the FIG. 7 protective cap maintain the circularity of the cap and its threaded connection to the fluid device, and also eliminate the possibility of the cap threads' separating due to dissimilar rates or amounts of expansion of the cap relative to the fluid device body, caused by different coefficients of thermal expansion of different cap and fluid device materials, or due to different amounts of material expansion or contraction in high-pressure environments, as in high fluid pressure applications or underwater applications.

Figure 8:
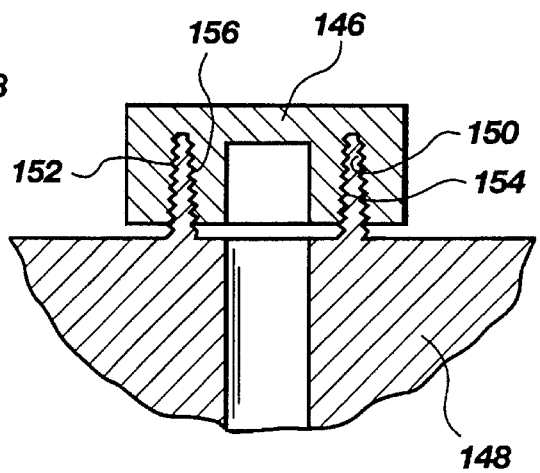
FIG. 8 is a sectional view through an alternative embodiment of a dual synchronized thread cap, illustrating the reverse concept of the cap of FIG. 7.

FIG. 8 is a sectional view through an alternative embodiment of a dual synchronized thread cap 146, illustrating the reverse concept of the cap and its threaded connection to the body of a fluid device 148. The protective cap 146 includes a set of female threads 50 formed in an annular channel, and adapted to engage mating male threads 152 formed in a cylindrical extension of the body of the fluid device, in a customary manner. In addition to the female threads 150, the protective cap of FIG. 8 also includes a set of synchronized male threads 154 formed in an annular channel, and adapted to engage and mate with corresponding synchronized female threads 156 formed on the internal surface of the fluid device cylindrical connector portion. As in FIG. 7, FIG. 8 illustrates the taper to both sets of tapered threads 150, 152 and 154, 156 to be somewhat exaggerated from what would generally be necessary in a conventional tapered sealing thread. The taper is exaggerated in the illustration in order that the existence of the taper be clearly evident from the drawings.

As in the cap of FIG. 7, the protective cap 146 shown in FIG. 8 is adapted to cover an open access area of a fluid device and provide a fluid and environmental seal therefor. Therefore, the mating synchronized threads of the cap and fluid device are tapered threads in order to effect this fluid seal as the cap is tightened down onto the fluid device.

Figure 9:
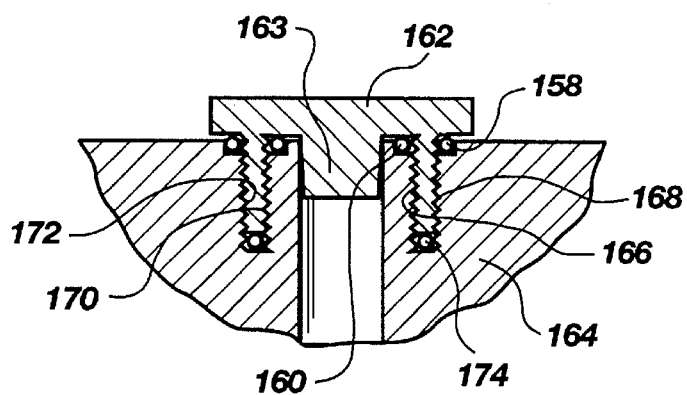
FIG. 9 is a sectional view similar to FIG. 7, illustrating the placement of O-rings for improved fluid seal.

FIG. 9 is a sectional view of a protective cap 162 similar to that shown in FIG. 7, illustrating the placement of O-ring seals 158 and 160 between the undersurface of the cap 162 and the external surface of the body of the fluid device 164. The cap 162 includes synchronized female threads 166 and male threads 168 that engage mating dual synchronized male threads and female threads 172 in an annular channel in the fluid device in identical orientation to that shown in FIG. 7. The dual synchronized threads of the FIG. 9 embodiment are not tapered threads, but rather are straight, non fluid-sealing threads, thus necessitating the O-rings 158 and 160 for fluid sealing between the cap and fluid device. Nonetheless, the protective cap 162 may be formed with a shoulder 163 that is designed to fit into the access opening to oppose any potential collapse of the access opening wall, as in the cap and shoulder 134, 135 in the embodiment of FIG. 7. In addition, a third O-ring 174 may be positioned in the bottom of the annular channel defined by the fluid device body synchronized male and female threads, 170 and 172, for providing additional fluid sealing capability between the fluid device body and its protective environmental cap.

Figure 10:
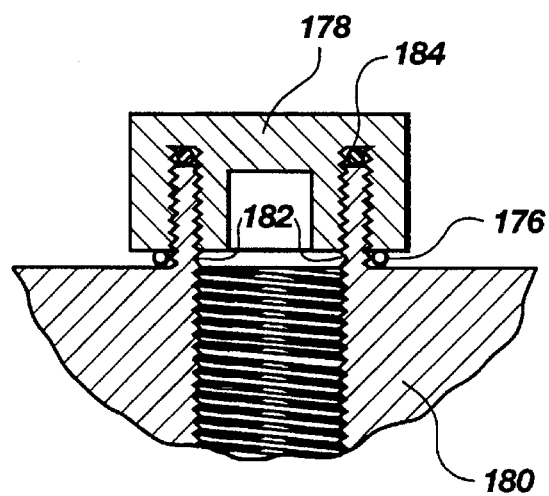
FIG. 10 is a sectional view similar to FIG. 8, illustrating the placement of O-rings for improved fluid seal.

FIG. 10 is a sectional view similar to FIG. 8, illustrating the placement of an O-ring for effecting the fluid seal between the protective cap 178 and body of the fluid device 180. The embodiment of FIG. 10, like that of FIG. 9, utilizes sets of synchronized straight threads as opposed to fluid sealing pipe threads, in order that the female threads 182 of the fluid device may also be used to facilitate assembly or adjustment of the pump, motor, valve, etc. Therefore, the O-ring 176 is positioned on the outside of the fluid device cylindrical extension adjacent the male threads.

Straight threads are utilized in the embodiment of FIG. 10 in instances wherein the female threads of the fluid device are also used for facilitating an internal function of the fluid device, as in a screw-threaded adjustment in a fluid relief valve, insertion of a fluid sealing plug into a fluid pump, motor, or valve, etc. In these instances, the fluid device female threads serve a dual purpose, and therefore cannot be tapered threads. The O-ring 176 is used in these instances to effect the fluid and environmental seal between the cap 178 and fluid device 180, as opposed to tapered threads which cannot be used in such an application. In addition, a second O-ring 184 may be positioned in the bottom of the annular channel defined by the protective cap synchronized threads for providing additional fluid sealing capability between the cap and fluid device body.

A variation of the environmental caps of FIGS. 7, 8, 9, and 10 would comprise a mixed combination of both straight and tapered threads. Specifically, the innermost mating threads in each embodiment can be straight threads, and the concentric outer threads can be tapered threads. In such a configuration, O-rings or other seals may or may not be necessary, depending on the particular application, thread type, depth, and possibly various other factors. Of course, these straight and tapered threads in combination can be reversed, except in the protective cap of FIG. 10, inasmuch as the female threads 182 must be straight threads because of their dual function.

Figure 11:
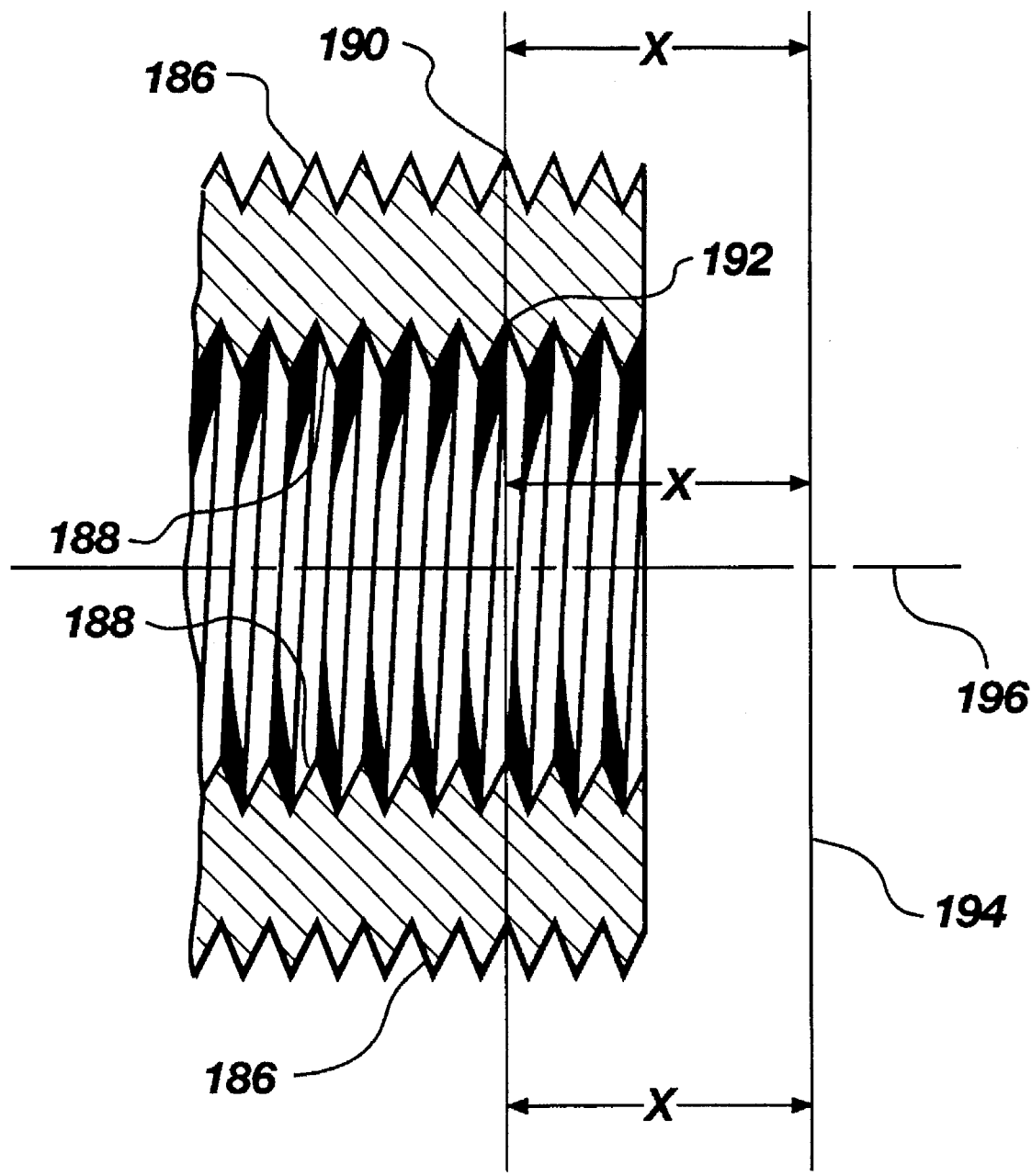
FIG. 11 is a sectional view through a portion of one connector incorporating the dual synchronized threads of the present invention, illustrating the location of the starting points for both sets of threads relative to each other, in order to maximize the amount of material between the sets of threads.

FIG. 11 is a sectional view through a portion of one connector incorporating the dual synchronized threads of the present invention, illustrating the location of the starting points for both sets of threads relative to each other, in order to maximize the amount of material between the sets of threads. The connector has a set of male threads 186 and synchronized female threads 188. The respective starting points of the threads are such that the crest 190 of the male threads 186 and a corresponding root 192 of the female threads are always co-planar. Stated differently, the crest 190 and root 192 are always equidistant (X) from a plane 194 that is normal to the axis 196 of the threads. In this manner, the maximum amount of connector material is always between the male and female threads, thereby maximizing the structural integrity of the connector itself, and of both sets of synchronized threads.

Those skilled in the art will readily appreciate that it will be virtually impossible to cross-thread a connector or closure member utilizing the dual synchronized thread design, if both sets of synchronized threads begin within the same plane and at the same rotational angle. This is because, with both sets of threads starting at precisely the identical location, each set will urge the other set into precise thread engagement, rather than into a potential cross-thread start. Additionally, attempting to cross-thread dual synchronized threads would be met with a force of resistance that is synergistic to that of the added resistance forces of attempting to cross-thread two single thread connectors.

Figure 12:
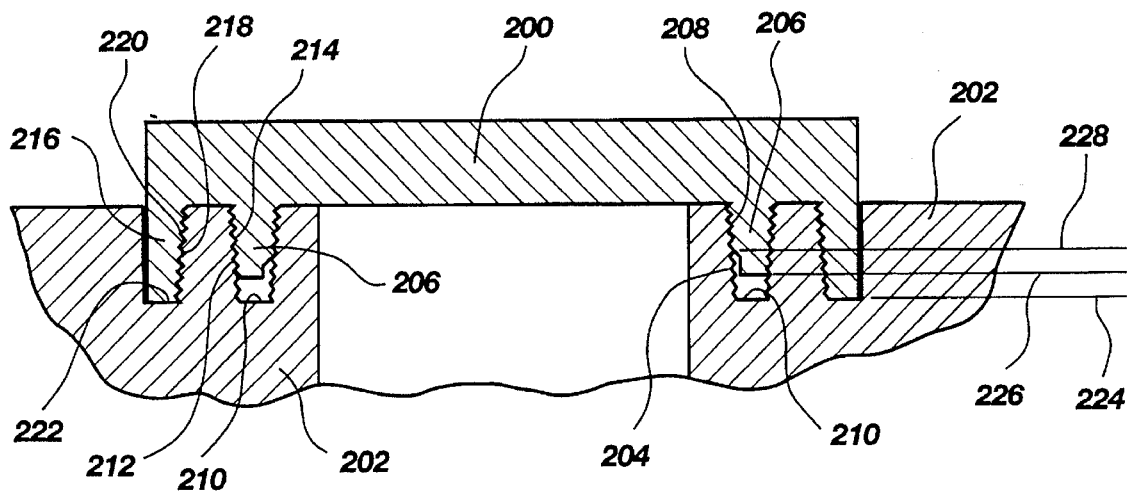
FIG. 12 is a sectional view through a multiple synchronized thread protective cap that is adapted to cover an open access area of a fluid device.

FIG. 12 is a sectional view through a multiple synchronized thread protective cap 200, similar to that shown in FIG. 7, the cap adapted to cover an open access area of a fluid device 202. This protective cap 200, as in the cap 134 of FIG. 7, includes a first set of female threads 204 formed on the inside surface of a first annular flange 206, adapted to engage a first set of mating male threads 208 formed in a first annular channel 210 in the body of the fluid device. In accordance with the present invention, the protective cap also includes a set of synchronized male threads 212 formed on the annular flange outer surface, adapted to engage and mate with corresponding synchronized female threads 214 formed in the fluid device first annular channel 210. These threads 212, 214 comprise the second set of mating synchronized threads.

Also in accordance with the present invention, the protective cap 200 is formed with a second annular flange 21 6, concentric with the first annular flange 206. A second set of female threads 21 8 is formed on the inside surface of the second annular flange 216, and is adapted to engage a mating second set of male threads 220 formed in a second, outer concentric annular channel 222 in the body of the fluid device. These threads 218, 220 comprise the third set of mating synchronized threads. The second, outer annular flange outer surface is smooth, and is designed to tightly engage the inner wall of the fluid device second, outer annular channel smooth wall to prevent the cap outer flange from expanding or deforming under the force of rotational thrust as the cap is screwed into (onto) the fluid device body. The combination of these three sets of mating synchronized threads has a synergistic effect on the overall strength of the mating threads to result in an equivalent thread strength that is greater than that of the sum of the three individual sets of mating threads.

As in the protective cap 134 of FIG. 7, the protective cap 200 of FIG. 12 is adapted to cover an open access area of a fluid device, as in a pump, motor, valve, etc., and therefore must effect a fluid and environmental seal between the cap and body of the fluid device. Therefore, the three sets of mating synchronized threads 204, 212, and 218 of the cap and 208, 210, and 220 of the fluid device body are tapered threads in order to effect the fluid seal therebetween as the cap is tightened down into the fluid device body. FIG. 12 illustrates the taper to all three sets of tapered threads to be somewhat exaggerated from what would generally be necessary in a conventional tapered sealing thread. The taper is exaggerated in the illustration in order that the existence of the taper be clearly evident from the drawings.

In accordance with the concept of the present invention, the protective cap 200 and its threaded connection into the fluid device 202 incorporate multiple synchronized threads in order to effect one or more of the objects of the present invention. Specifically, the multiple synchronized threads of the FIG. 12 protective cap maintain the circularity of the cap and its threaded connection to the fluid device, and also eliminate the possibility of the cap threads' separating due to dissimilar rates or amounts of expansion of the cap relative to the fluid device body, caused by different coefficients of thermal expansion of different cap and fluid device materials, or due to different amounts of material expansion or contraction in high-pressure environments, as in high fluid pressure applications or underwater applications.

Figure 13:
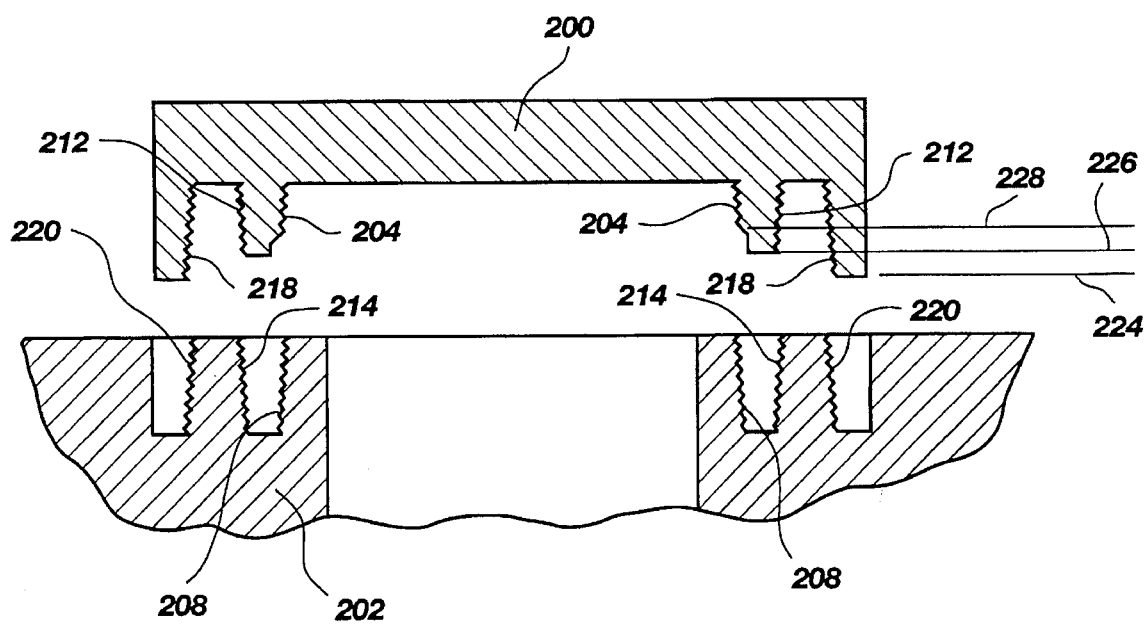
FIG. 13 is a sectional view similar to FIG. 12, showing the protective cap removed from the fluid device, and more clearly illustrating the parallel planes in which the multiple synchronized threads of the cap begin.

As is more clearly shown in FIG. 13, each of the three different sets of mating synchronized threads begins within a different plane transverse to the thread axis. The third set of mating threads 218, 220 (the cap second set of female threads and fluid device body second set of male threads) begins within a first transverse plane 224; the second set of mating threads 212, 214 (the cap male threads and fluid device body female threads) begins within a second transverse plane 226; and the first set of mating threads 204, 208 (the cap first set of female threads and fluid device body first set of male threads) begins within a third transverse plane 228. Those skilled in the art will readily appreciate that the third set of mating threads 218, 220 will engage first, and will effect a number of complete rotations before the second set of mating threads 212, 214 engages. Likewise, the third and second sets of mating threads will have effected a number of complete rotations before the first set of mating threads 204, 208 begins to engage. In this manner, cross-threading is virtually eliminated because of the fact that the first-to-engage thread set 218, 220 has engaged for a number of complete rotations before the second-to-engage thread set 212, 214 begins to engage. If the first-to-engage thread set is cross-threaded, the second-to-engage thread set will not align properly, and will therefore prevent the two mating pieces from rotating further. If the initial cross-threading is minimal, in all likelihood, the second-to-engage thread set will also cross-thread. With two sets of threads cross-threaded, further rotation of the two mating pieces will essentially be prevented.

FIG. 13 illustrates the concept of having the various sets of mating threads begin within sequential parallel planes transverse to the thread axis. In essence, these various sets of mating threads on the cap 200 begin at spaced apart rotational distances that are integer factors of 360°. Specifically, FIG. 13 illustrates that the transverse plane 226 is spaced from the transverse plane 224 a distance of two threads. Said another way, the second set of mating threads 212, 214 will engage 720° (two complete revolutions) following the initial engagement of the first-to-engage set of mating threads 218, 220. Likewise, the third-to-engage set of mating threads 204, 208 will initially engage 720° (two complete revolutions) following the initial engagement of the second-to-engage set of mating threads 212, 214.

The inventors have also determined that it is feasible to begin sequential sets of mating threads at respective starting points that are not integer multiples of 360°. Specifically, and with reference again to FIG. 11, although the male threads 186 and female threads 188 begin within the same plane, their starting points are out of phase by 180°. In this manner, the crests and roots of one set of threads is always coplanar with respective roots and crests of the other set of threads. As previously stated, this orientation maximizes the amount of material between the male and female threads, in order to optimize the structural integrity of the connector itself, and therefore both sets of threads. It follows that, in order to optimize the structural integrity of multiple threaded connectors, adjacent thread sets should begin out of phase by a multiple of an integer plus one-half in order to maintain the coplanar alignment of adjacent root- to-crest and crest-to-root thread relationship, as shown in FIG. 11.

Figure 14:
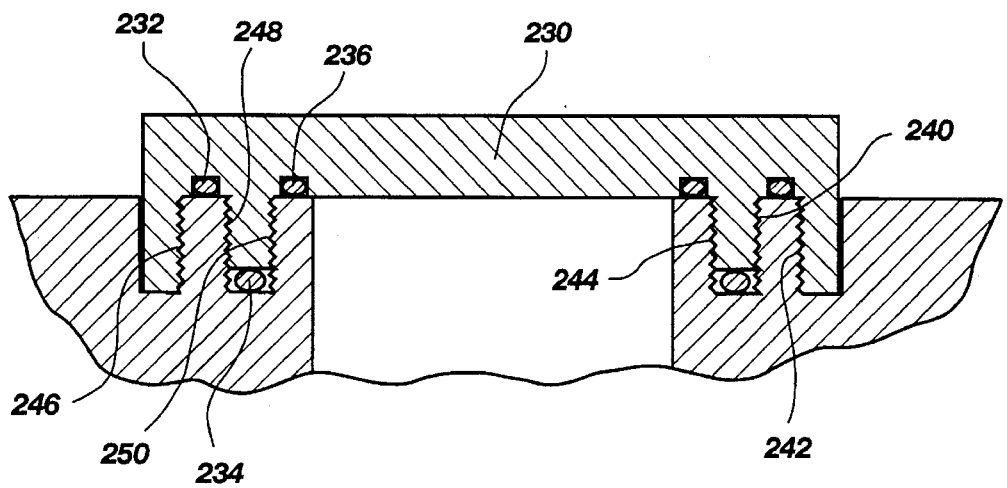
FIG. 14 is a sectional view similar to FIG. 12, illustrating the straight, non-tapered threads and placement of O-rings for improved fluid seal.

FIG. 14 is a sectional view of a protective cap 230 similar to that shown in FIG. 12, illustrating the placement of O-ring seals 232, 234, and 236 between the undersurface of the cap 230 and the external surface of the fluid device body 238. As in the structure of FIGS. 12 and 13, the cap 230 includes two sets of female threads 240 and 242 synchronized with each other and with one set of male threads 244. These synchronized threads engage respective mating synchronized first male threads 246, second male threads 248, and female threads 250 in the fluid device body in identical orientation to that shown in FIGS. 12 and 13. The multiple synchronized threads of the FIG. 14 embodiment are not tapered threads, but rather are straight, non fluid-sealing threads, thus necessitating respective O-rings 230, 234, and 236 for fluid sealing between the cap and fluid device.

Figure 15:
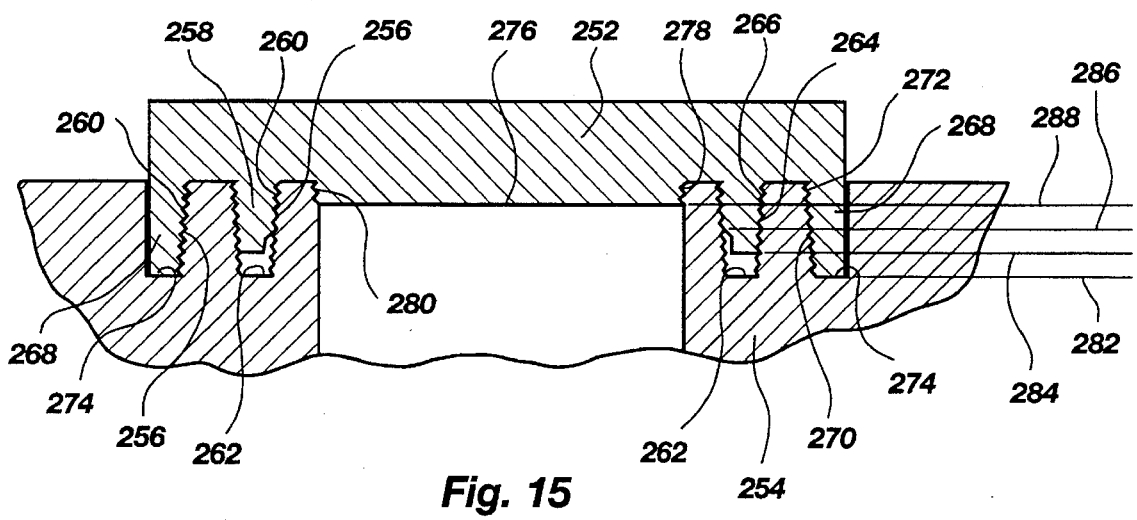
FIG. 15 is a sectional view through a multiple synchronized thread protective cap that is adapted to cover an open access area of a fluid device, the cap and device each incorporating two sets of synchronized male and female threads.

FIG. 15 is a sectional view through a multiple synchronized thread protective cap 252, similar to that shown in FIGS. 12 and 13, the cap adapted to cover an open access area of a fluid device 254. This protective cap 252, as in the cap 200 of FIGS. 12 and 13, includes a first set of female threads 256 formed on the inside surface of a first annular flange 258, adapted to engage a first set of mating male threads 260 formed in a first annular channel 262 in the body of the fluid device. The protective cap also includes a first set of synchronized male threads 264 formed on the annular flange outer surface, adapted to engage and mate with a corresponding first set of synchronized female threads 266 formed in the fluid device first annular channel 262. These threads 264, 266 comprise the second set of mating synchronized threads.

The protective cap 252 is formed with a second annular flange 268, concentric with the first annular flange 258. A second set of female threads 270 is formed on the inside surface of the second annular flange 268, and is adapted to engage a mating second set of male threads 272 formed in a second, outer concentric annular channel 274 in the body of the fluid device. These threads 270, 272 comprise the third set of mating synchronized threads. The second, outer annular flange outer surface is smooth, and is designed to tightly engage the inner wall of the fluid device second, outer annular channel smooth wall to prevent the cap outer flange from expanding or deforming under the force of rotational thrust as the cap is screwed into (onto) the fluid device body.

As in the protective cap 134 of FIG. 7, the protective cap 252 is formed with a shoulder 276 that is designed to fit into the access opening to oppose wall collapse. This cap shoulder 276 is formed with a second set of synchronized male threads 278 formed on the outer surface of the cap shoulder, adapted to engage and mate with a corresponding second set of synchronized female threads 280 formed in the cylindrical interior surface of the fluid device body access opening. These threads 278, 280 comprise the fourth set of mating synchronized threads. The combination of these four sets of mating synchronized threads has a synergistic effect on the overall strength of the mating threads to result in an equivalent thread strength that is greater than that of the sum of the four individual sets of mating threads.

Also as in the protective cap 200 of FIGS. 12 and 13, the protective cap 252 of FIG. 15 is adapted to cover the open access area of a fluid device, as in a pump, motor, valve, etc., and therefore must effect a fluid and environmental seal between the cap and body of the fluid device. Therefore, the four sets of mating synchronized threads 256, 264, 270, and 278 of the cap and 260, 262, 272, and 280 of the fluid device body are tapered threads in order to effect the fluid seal therebetween as the cap is tightened down into the fluid device body. FIG. 15 illustrates the taper to all four sets of tapered threads to be somewhat exaggerated from what would generally be necessary in a conventional tapered sealing thread. The taper is exaggerated in the illustration in order that the existence of the taper be clearly evident from the drawings.

In accordance with the concept of the present invention, the protective cap 252 and its threaded connection into the fluid device 254 incorporate multiple synchronized threads in order to effect one or more of the objects of the present invention. Specifically, the multiple synchronized threads of the FIG. 15 protective cap maintain the circularity of the cap and its threaded connection to the fluid device, and also eliminate the possibility of the cap threads' separating due to dissimilar rates or amounts of expansion of the cap relative to the fluid device body, caused by different coefficients of thermal expansion of different cap and fluid device materials, or due to different amounts of material expansion or contraction in high-pressure environments, as in high fluid pressure applications or underwater applications.

As is shown in FIG. 15, each of the four different sets of mating synchronized threads begins within a different plane transverse to the thread axis. The third set of mating threads 270, 272 (the cap second set of female threads and fluid device body second set of male threads) begins within a first transverse plane 282; the second set of mating threads 264, 266 (the cap first set of male threads and fluid device body first set of female threads) begins within a second transverse plane 284; the first set of mating threads 256, 258 (the cap first set of female threads and fluid device body first set of male threads) begins within a third transverse plane 286; and the fourth set of mating threads 278, 280 (the cap second set of male threads and fluid device body second set of female threads) begins within a fourth transverse plane 288. Those skilled in the art will readily appreciate that the third set of mating threads 270, 272 will engage first, and will effect a number of complete rotations before the second set of mating threads 264, 266 engages. Likewise, the third and second sets of mating threads will have effected a number of complete rotations before the first set of mating threads 256, 258 begins to engage, and the third, second, and first sets of mating threads will have effected a number of complete rotations before the fourth set of mating threads 278, 280 begins to engage. As previously explained, cross-threading of the multiple thread sets is virtually eliminated.

FIG. 15 illustrates the concept of having the various sets of mating threads begin within sequential parallel planes transverse to the thread axis. In essence, these various sets of mating threads on the cap 252 begin at spaced apart rotational distances that are integer factors of 360°. Specifically, FIG. 15 illustrates that the transverse plane 282 is spaced from the transverse plane 284 a distance of two threads. Said another way, the second set of mating threads 264, 266 will engage 720° (two complete revolutions) following the initial engagement of the first-to-engage set of mating threads 270, 272. Likewise, the third-to-engage set of mating threads 256, 258 will initially engage 720° (two complete revolutions) following the initial engagement of the second-to-engage set of mating threads 264, 266, and the fourth-to-engage set of mating threads 278, 280 will initially engage 720° (two complete revolutions) following the initial engagement of the third-to-engage set of mating threads 256, 258.

As in the protective cap and fluid device body of FIGS. 12 and 13, it is feasible to begin sequential sets of mating threads at respective starting points that are not integer multiples of 360°, in order to optimize the structural integrity of the connector itself, and therefore both sets of threads.

Figure 16:
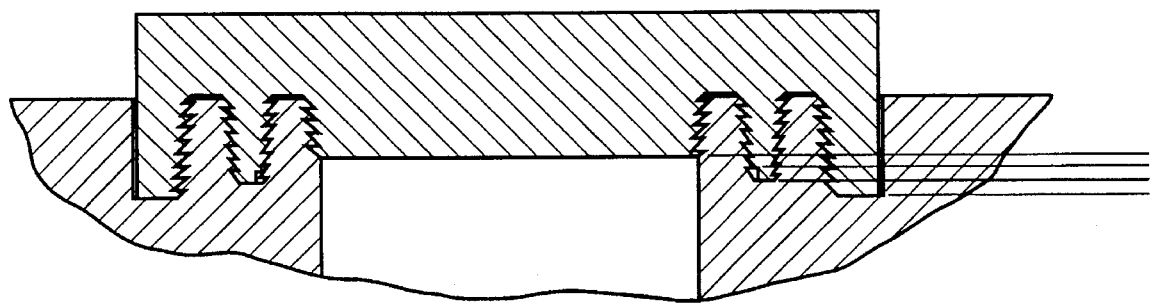
FIG. 16 is a sectional view through a multiple synchronized thread protective cap that is adapted to cover an open access area of a fluid device, the cap and device each incorporating two sets of synchronized male and female buttress threads.

FIG. 16 is a sectional view of a protective cap similar to that shown in FIG. 15, illustrating the use of multiple (four in this case) sets of synchronized threads. The threads in the FIG. 16 embodiment are buttress threads, however. The previous description of the FIG. 15 embodiment relating to the operation and benefit of four sets of synchronized threads likewise applies to the embodiment shown in FIG. 16. Therefore, the individual sets of threads and the parallel planes in which the sequential sets of synchronized threads initially engage will not be repeated. Likewise, inasmuch as the structure, operation, and benefit of the FIG. 16 embodiment is essentially identical to that of FIG. 15, the individual numbered elements of FIG. 15 will not be renumbered in FIG. 16.

Those skilled in the art will readily appreciate that the use of buttress threads in multiple synchronized thread applications such as illustrated in FIG. 16 results in the added benefit that buttress threads eliminate the creation of lateral thrust on the cap and body portion threaded surfaces as the cap is tightly threaded into the body portion. This is, of course, the nature and design of buttress threads.

Figure 17:
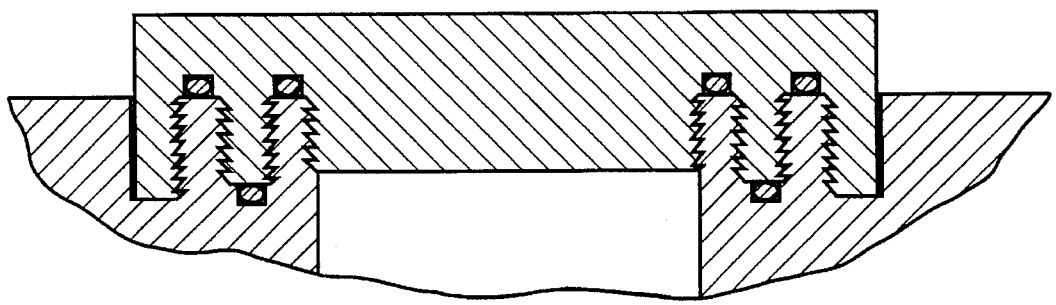
FIG. 17 is a sectional view similar to FIG. 16, illustrating the the straight, non-tapered threads and placement of O-rings for improved fluid seal.

FIG. 17 is a sectional view of a protective cap similar to that shown in FIG. 16, illustrating the placement of O-ring seals between the undersurface of the cap and the external surface of the fluid device body. As in the embodiment of FIG. 16, the threads of the FIG. 17 embodiment are buttress threads, and serve the same added function as described with reference to FIG. 16. As in the structure of FIG. 15, the cap includes two sets of female threads synchronized with each other and with two sets of male threads. These synchronized threads engage respective mating synchronized first male threads, second male threads, first female threads, and second female threads in the fluid device body in identical orientation to that shown in FIG. 15. The previous description of the FIG. 15 embodiment relating to the operation and benefit of four sets of synchronized threads likewise applies to the embodiment shown in FIG. 17. Therefore, the individual sets of threads and the parallel planes in which the sequential sets of synchronized threads initially engage will not be repeated. Likewise, inasmuch as the structure, operation, and benefit of the FIG. 17 embodiment is essentially identical to that of FIG. 15, the individual numbered elements of FIG. 15 will not be renumbered in FIG. 17.

The multiple synchronized threads of the FIG. 17 embodiment are not tapered buttress threads, but rather are straight, non fluid-sealing buttress threads, thus necessitating respective O-rings for fluid sealing between the cap and fluid device.

Similar to that shown in the embodiment of FIG. 7, FIGS. 16 and 17 also includes a cap with a shoulder that is designed to fit into the access opening to oppose collapse of the access opening wall.

From the foregoing, it will be seen that this invention is one well adapted to attain all of the ends and objectives herein set forth, together with other advantages which are obvious and which are inherent to the apparatus. It will be understood that certain features and subcombinations are of utility and may be employed with reference to other features and subcombinations. This is contemplated by and is within the scope of the claims. As many possible embodiments may be made of the invention without departing from the scope of the claims. For example, the concept of this invention is intended to embrace left-hand threads and multiple parallel thread applications, that is, connections wherein two or more threads are cut beside each other in order to effect the two objectives: (1) fine thread size for greater strength per linear increment, and (2) greater lead, i.e., greater linear travel per rotation in fine threads. One or both of the sets of mating dual synchronized threads may be of the multiple thread type, the obvious limitation being that the lead of the threads, as opposed to the pitch in these instances, be equal for both thread sets. It should also be apparent that in some applications, it may be desirable for one set of mating threads to engage before the other set engages, thereby facilitating attachment of the two connectors. In addition, the term "connector" is to be broadly construed to include any device wherein screw threads are utilized to connect or attach two members together, e.g., the section of a solid rocket booster housing. It is to be understood that all matter herein set forth or shown in the accompanying drawings is to be interpreted as illustrative and not in a limiting sense.

What is claimed is:

1. A threaded closure assembly comprising:
   (a) a unitary first member defining an access opening and having:
      (1) an annular channel surrounding the access opening, the annular channel having:
         (A) a first set of male threads and
         (B) a set of female threads, and
      (2) an exterior cylindrical surface being concentric and spaced radially from said channel having a second set of male threads, the first member male threads being synchronized with each other and with the first member female threads; and
   (b) a unitary cap member having
      (1) a first set of female threads adapted to mate with the first member first set of male threads,
      (2) a set of male threads adapted to mate with the first member female threads, and
      (3) an annular flange being concentric and spaced radially from said first set of threads having a second set of female threads adapted to mate with the first member second set of male threads, the cap member female threads being synchronized with each other and with the cap member male threads.

2. A threaded closure assembly as set forth in claim 1, wherein the cap member further comprises an annular support shoulder concentric with the threads for engaging a wall of the first member access opening to prevent collapse of the access opening wall as the cap member is screw-threaded into the first member.

3. A threaded closure assembly as set forth in claim 1, wherein all of the threads are straight, non-tapered threads.

4. A threaded closure assembly as set forth in claim 3, further comprising sealing means for fluidly sealing between the first member and cap member.

5. A threaded closure assembly as set forth in claim 4, wherein the sealing means comprises at least one O-ring.

6. A threaded closure assembly as set forth in claim 1, wherein all of the threads are tapered fluid sealing threads.

7. A threaded closure assembly as set forth in claim 1, wherein respective sets of mating threads are oriented to initiate engagement simultaneously as the cap member is attached to the first member.

8. A threaded closure assembly as set forth in claim 1, wherein respective sets of mating threads are oriented to initiate engagement sequentially as the cap member is attached to the first member.

9. A threaded closure assembly as set forth in claim 1, wherein the first thread of each set of cap member threads begins within the same plane transverse to the thread axis.

10. A threaded closure assembly as set forth in claim 1, wherein the first thread of each set of cap member threads begins within a different plane transverse to the thread axis.

11. A threaded closure assembly as set forth in claim 1, wherein one or both sets of the first member threads comprises multiple threads.

12. A threaded closure assembly as set forth in claim 1, wherein the male and female threads are oriented in a manner to maximize the amount of material between the male and female threads.

13. A threaded closure assembly comprising:
   (a) a first member defining an access opening, the access opening having a first set of female threads, the first member having:
      (1) an annular channel surrounding the access opening, the annular channel having:
         (A) a first set of male threads and
         (B) a second set of female threads, and
      (2) an exterior cylindrical surface being concentric and spaced radially from said channel having a second set of male threads, the first member male threads being synchronized with each other and with the first member female threads; and
   (b) a cap member having:
      (1) a support shoulder having a first set of male threads adapted to mate with the first member access opening first set of female threads,
      (2) a first annular flange being concentric and spaced radially from said first set of threads of the first member having:
         (A) a first set of female threads adapted to mate with the first member first set of male threads, and
         (B) a second set of male threads adapted to mate with the first member second set of female threads, and
      (3) a second annular flange being concentric and spaced radially from said first annular flange having a second set of female threads adapted to mate with the first member second set of male threads, the cap member male threads being synchronized with each other and with the cap member female threads.

14. A threaded closure assembly as set forth in claim 13, wherein all of the threads are straight, non-tapered threads.

15. A threaded closure assembly as set forth in claim 14, further comprising sealing means for fluidly sealing between the first member and cap member.

16. A threaded closure assembly as set forth in claim 15, wherein the sealing means comprises at least one O-ring.

17. A threaded closure assembly as set forth in claim 13, wherein all of the threads are tapered fluid sealing threads.

18. A threaded closure assembly as set forth in claim 13, wherein respective sets of mating threads are oriented to initiate engagement simultaneously as the cap member is attached to the first member.

19. A threaded closure assembly as set forth in claim 13, wherein respective sets of mating threads are oriented to initiate engagement sequentially as the cap member is attached to the first member.

20. A threaded closure assembly as set forth in claim 13, wherein the first thread of each set of cap member threads begins within the same plane transverse to the thread axis.

21. A threaded closure assembly as set forth in claim 13, wherein the first thread of each set of cap member threads begins within a different plane transverse to the thread axis.

22. A threaded closure assembly as set forth in claim 13, wherein one or both sets of the first member threads comprises multiple threads.

23. A threaded closure assembly as set forth in claim 13, wherein the male and female threads are oriented in a manner to maximize the amount of material between the male and female threads.

* * * * *